(12) United States Patent
Reif et al.

(10) Patent No.: US 8,304,491 B2
(45) Date of Patent: Nov. 6, 2012

(54) PRODUCING POLYCHLOROPRENE LATICES

(76) Inventors: Lothar Reif, Dormagen (DE); Christian Lente, Rommerskirchen (DE)

(*) Notice: Subject to any disclaimer, the term of this patent is extended or adjusted under 35 U.S.C. 154(b) by 0 days.

(21) Appl. No.: 13/247,219

(22) Filed: Sep. 28, 2011

(65) Prior Publication Data

US 2012/0022213 A1    Jan. 26, 2012

Related U.S. Application Data

(62) Division of application No. 11/897,135, filed on Aug. 29, 2007, now Pat. No. 8,063,136.

(30) Foreign Application Priority Data

Sep. 25, 2006 (DE) .......... 10 2006 045 128

(51) Int. Cl.
 C08L 11/02 (2006.01)
 C08L 11/00 (2006.01)
 C08F 2/22 (2006.01)
(52) U.S. Cl. ..................... 524/834; 526/295
(58) Field of Classification Search .......... 524/834; 526/295
See application file for complete search history.

(56) References Cited

U.S. PATENT DOCUMENTS

| | | | |
|---|---|---|---|
| 3,337,485 A * | 8/1967 | Dale et al. | 524/251 |
| 3,887,539 A | 6/1975 | Barth | |
| 3,904,590 A * | 9/1975 | Logothetis | 528/384 |
| 3,925,340 A * | 12/1975 | Khan | 526/217 |
| 4,417,036 A | 11/1983 | Nolte et al. | |
| H0002092 H | 12/2003 | Bauman et al. | |
| 7,799,881 B2 * | 9/2010 | Lima et al. | 526/201 |

FOREIGN PATENT DOCUMENTS

GB 1545104 A * 5/1979
WO 0100683 A1 1/2001

OTHER PUBLICATIONS

J.C. Carl, "Neoprene Latex", E.I. DePont de Nemours, (1962), p. 67.
W. Obrecht, "B3) Polymerisation von 2-Chlor-1,3-butadien (Chloropen)", Houben-Weyl: Methoden der Organischen Chemie, Macromolecular Materials, (1987) 20(3):842-859.
S. Guggenberger, "Neoprene (Polychloroprene)-Based Solvent and Latex Adhesives", Handbook of Adhesives, 3rd Ed., New York (1990), pp. 284-306.
European Search Report dated Sep. 11, 2009.

* cited by examiner

*Primary Examiner* — Satya Sastri
(74) *Attorney, Agent, or Firm* — Michael A. Miller

(57) ABSTRACT

The novel process provides latices of homo- and copolymers of chloroprene and of one or more further copolymerizable monomers at a higher reaction rate and hence in an improved space-time yield. The latices obtained have a high gel content, distinctly lower levels of by-products, in particular of chloroprene dimer, than prior art products, and are useful, if appropriate in concentrated form, for a wide variety of applications.

9 Claims, No Drawings

PRODUCING POLYCHLOROPRENE LATICES

This application is a divisional of U.S. patent application Ser. No. 11/897,135 filed Aug. 29, 2007, entitled "PRODUCING POLYCHLOROPRENE LATICES", the contents of which are hereby incorporated by reference in their entirety

FIELD OF THE INVENTION

The present invention relates to a novel process for producing latices of homo- or copolymers of chloroprene and if appropriate one or more further copolymerizable monomers, to the resulting, similarly novel latices in if appropriate concentrated form, to their use and also to the products obtained in these uses.

BACKGROUND OF THE INVENTION

Latices of polychloroprene are industrially produced by free-radical emulsion polymerization of chloroprene (2-chloro-1,3-butadiene), if appropriate by copolymerization with suitable monomers. Such latices will herein also be collectively referred to as "polychloroprene latices". The monomers are admixed in an aqueous medium with an emulsifier system in the course of latex production. This emulsifier system is generally anionic in nature, but occasionally nonionic or cationic systems are also used. The temperature range in which the polymerization is carried out comprises values of about 0° C. to about 60° C. The polymerization can thus be initiated by thermally disintegrating free-radical formers, or by means of redox systems. Generally, molecular weight regulators such as mercaptans or xanthogen disulphides are also used. In some cases, the molecular weight of the end product is also set by copolymerizing with sulphur and then splitting the resulting sulphidic bonds. The desired degree of conversion is set by stopping the reaction with a suitable agent. In the overwhelming number of cases, the resulting dispersion of polychloroprene in water, i.e. the so-called polychloroprene latex, is subsequently demonomerized by passing steam through it. A portion of the product obtained as a result finds direct industrial use as a latex, but the larger portion is freed of adherent water by coagulation, usually freeze coagulation, and shipped as a solid product to its ultimate use.

The polymerization generally by-produces products such as, for example, dimers of chloroprene or other low molecular weight compounds which can have an undesirable influence on the odor of the final product, whether it is to be used as latex or else as a solid rubber. These by-products are only imperfectly removable by the above-described steam treatments in the course of latex devolatilization or else by water wash in the course of the work-up of the solid rubber.

One way to reduce the undesirable odorant by-products to some degree at least consists in conducting the polymerization at a reduced polymerization temperature. However, a reduced polymerization temperature means directly a reduced polymerization rate and therefore is undesirable for economic reasons. It is further known that the crystallization tendency of polychloroprene products more often militates against the planned use.

One technologically important property of synthetic latices is the so-called gel content, which characterizes the fraction of the polymer that is insoluble in a certain solvent (toluene, for example). A high gel content is indispensable in various applications, for example for a high strength of a "wet", i.e. incompletely dried, film of the respective material. A high gel content is achievable when using chloroprene (as in the case of all emulsion-polymerized dienes) by crosslinking by means of multifunctional monomers or by a high conversion for the polymerization reaction. A high conversion (>95% for example), however, is associated with economically less desirable long polymerization times, in particular when relatively low polymerization temperatures are employed.

Yet an economically better polymerization at relatively high temperatures, which leads faster to the desired degrees of conversion, results in increased formation of dimeric by-products via Diels-Alder reactions, and there are other secondary reactions observed to take place. This frequently gives rise to products which lack utility for some applications due to the odor nuisance generated during production or use of the end products.

Various methods have been described in the past of "masking" the odorant by-products by adding scents having a more intense odor. Examples of such masking agents are "scent of hay", anisaldehyde, vanillin, camphor. This method is described by J. C. Carl in "Neoprene Latex", E. I. DuPont de Nemours (self-published monograph), 1962, page 67. WO-A-01/00683 describes a method comprising the removal of odorants by means of ozone or hydrogen peroxide. Common to all these methods is that they mask or remove the odorants formed, but do not avoid or minimize their formation.

SUMMARY OF THE INVENTION

It is an object of the present invention to provide a process for producing polychloroprene latices which proceeds at a high rate of reaction, yet at the same time avoids the formation of odor-nuisance by-products and further leads to latices whose technological properties are not inferior to those of prior art latices.

We have found that this object is achieved, surprisingly, when the emulsion polymerization is not, as in the prior art, carried out at a constant temperature setting, but that the polymerization temperature is raised in the course of the polymerization.

DETAILED DESCRIPTION OF THE INVENTION

The invention accordingly provides a process for producing a latex of homo- or copolymers of chloroprene and if appropriate one or more further copolymerizable unsaturated monomers by emulsion polymerization, comprising, proceeding from a starting temperature $T_s$, raising the polymerization temperature during the emulsion polymerization
 a) by at least 3° C. above the starting temperature $T_s$ up to a conversion of 50% and subsequently
 b) by at least 6° C. above the starting temperature $T_s$ up to a conversion of 90%.

The process according to the invention provides a higher rate of reaction than the prior art. In addition to this advantage, which substantially enhances the economic attractiveness of the process, it further generates a distinctly lower level of by-products than prior art processes when the polymerization is carried out at a constant reaction temperature. Owing to the low level of secondary components, the process is thus also ecologically advantageous.

The process according to the invention comprises an emulsion polymerization carried out at a pH in the range from 9 to 14 and preferably in the range from 11 to 13. The pH is set with customary additives, preference being given to KOH or NaOH.

The polymerization is initiated using conventional initiators or initiator systems. Examples of initiators and initiator systems are: formamidinesulphinic acid, potassium peroxodisulphate, redox systems based on potassium peroxodisulphate and if appropriate silver salt (sodium salt of anthraquinone-beta-sulphonic acid), examples of redox partners being compounds such as formamidinesulphinic acid, the sodium salt of hydroxymethanesulphinic acid, sodium sulphite and sodium dithionite. Redox systems based on peroxides and hydroperoxides are also suitable. The customary amounts to be used of the initiator/initiator system can easily be determined by a person skilled in the art on the basis of his or her expertise, depending on factors such as, for example, the size of the reaction vessel or of the tank or reactor.

In accordance with an essential feature of the invention, the polymerization temperature is raised in the course of the emulsion polymerization reaction, from a starting temperature $T_s$.

The starting temperature $T_s$ and the polymerization temperature typically range from 0° C. to 70° C., preferably from 10° C. to 60° C. and more preferably from 35° C. to 50° C.

In the process according to the invention, proceeding from a starting temperature $T_s$, it is important that the polymerization temperature is raised
  a) by at least 3° C. above the starting temperature $T_s$ up to a conversion of 50% and subsequently
  b) by at least 6° C. above the starting temperature $T_s$ up to a conversion of 90%.

In a preferred embodiment, proceeding from a starting temperature $T_s$, the polymerization temperature is raised
  a) by at least 5° C. above the starting temperature $T_s$ up to a conversion of 50% and subsequently
  b) by at least 6° C., preferably by at least 8° C., above the starting temperature $T_s$ up to a conversion of 90%.

In other words:

If the starting temperature $T_s$ is increased by at least 3° C. up to a conversion of 50%, the temperature is thereafter increased once more by at least 3° C. up to a conversion of 90%.

If the starting temperature $T_s$ is preferably increased by at least 5° C. up to a conversion of 50%, the temperature reached at that point is subsequently increased once more by at least 1° C. and preferably by at least 3° C. up to a conversion of 90%.

The raising of the polymerization temperature in the process according to the invention can be effected either in stages or alternatively continuously.

With this specific form of temperature management in the process according to the invention, the temperature at the start is usually lower than that of existing, isothermal emulsion polymerizations for producing polychloroprene latices and is then gradually raised only for the temperature at the end of the polymerization reaction being elevated compared with the prior art processes. It will be found advantageous to engineer the temperature increases in the process according to the invention such that the average polymerization temperature resulting over the polymerization time comes close or is equal to the isothermal temperature of a prior art reaction management.

The process according to the invention provides latices based on polychloroprene or based on copolymers of chloroprene and, if appropriate, one or more further copolymerizable unsaturated monomers.

Useful copolymerizable unsaturated monomers for the production of copolymers are described in "Houben-Weyl: Methoden der Organischen Chemie", Volume 20, Part 3, Macromolecular Materials, 1987, page 844. Preference is given to monomers having 3 to 12 carbon atoms and 1 or 2 copolymerizable C.dbd.C double bonds per molecule.

Examples of preferred copolymerizable monomers are 2,3-dichlorobutadiene and 1-chlorobutadiene.

The process according to the invention can be carried out either batchwise or else continuously. Continuous polymerization is preferred. Continuous operation can also be realized for example by series connection of various reaction vessels or tanks with increasing polymerization temperature.

The way in which emulsion polymerization is carried out in principle is known to a person skilled in the art. Customarily, the aqueous phase containing the emulsifier system and the monomer or monomers are introduced into a reaction vessel as initial charge and are subsequently purged with an inert gas, preferably nitrogen. The reaction system is then brought or heated to the desired starting temperature for the polymerization and the polymerization is started by addition of the initiator or initiator system. The addition of the initiator or initiator system can be done in one or more portions, or else continuously, depending on type. After the desired degree of conversion has been reached, the polymerization is customarily stopped by addition of a suitable agent. Useful stoppers include in particular diethylhydroxylamine or phenothiazine.

Preferably, after the polymerization, the residual chloroprene and also the further optional monomers used are removed. This is done by steam distillation for example. A steam distillation is carried out for example as described in "Houben-Weyl: Methoden der organischen Chemie" Volume 20, Part 3 Macromolecular Materials, (1987) pages 842-859.

The aqueous polychloroprene homo- or copolymer dispersions (the so-called latices) obtained by the process according to the invention are likewise novel.

The present invention therefore further provides an aqueous dispersion (latex) of a homo- or copolymer of chloroprene and if appropriate one or more further copolymerizable unsaturated monomers, obtainable by the process according to the invention, this homo- or copolymer having a gel content in toluene at 23° C. of greater than 60% by weight, based on the homo- or copolymer, preferably of greater than 80% by weight and more preferably of greater than 90% by weight.

The so-called gel content is a parameter familiar to a person skilled in the art. The gel content is that fraction of polychloroprene latex that is insoluble in toluene at 23° C. To determine it, 250 mg of the polychloroprene latex are swollen in 20 ml of toluene by shaking at 23° C. for 24 hours. After centrifugation at 20,000 revolutions per minute, the insoluble fraction is separated off and dried. The gel content is calculated as the ratio of the dried residue to the initial weight and is reported in per cent by weight.

When a copolymer of chloroprene and one or more further copolymerizable unsaturated monomers is produced in the process according to the invention, this copolymer preferably has a chloroprene content of at least 20% by weight, preferably 50% by weight.

The aqueous dispersion (latex) according to the invention thus is notable for the aforementioned high gel content of the polymer and also for a very low fraction of undesirable secondary components, in particular chloroprene dimers. These dimers of chloroprene comprise 6 structurally isomeric compounds. The latices therefore have only a very low odor and, what is more, are obtainable by an economically advantageous process.

Odor comparisons between various substances, under identical defined conditions, can be carried out by sensory testing. In the present case of the polychloroprene latex according to the invention, it is further possible to carry out an assay of chloroprene dimers by gas chromatography, these dimers serving as index substance for the odor.

The polychloroprene latices according to the invention can be further concentrated. Customarily, for this purpose, the aqueous dispersions of the homo- or copolymers of chloroprene and if appropriate one or more further copolymerizable unsaturated monomers are concentrated by coagulation. Such methods of coagulation are well known to a person skilled in the art. Freeze coagulation is preferred, removing adherent water and obtaining a concentrated latex in the form of a solid product.

The invention thus also provides a concentrated latex of a homo- or copolymer of chloroproprene and if appropriate one or more further copolymerizable unsaturated monomers, the homo- or copolymer having a gel content in toluene at 23° C. of greater than 60% by weight, based on the homo- or copolymer, preferably of greater than 80% by weight and more preferably of greater than 90% by weight.

The polychloroprene latices according to the invention and similarly the concentrated polychloroprene latices are very useful for various applications.

The invention accordingly further provides for the use of the invention's polychloroprene latices, if appropriate in concentrated form, for producing waterborne disperse adhesives, the polychloroprene latices, if appropriate in concentrated form, being used either as sole latex component or in admixture with other latices.

It is very advantageous for this use that latices are notable for low intrinsic odor while at the same time possessing high tack and high thermal stability.

In this use, the polychloroprene latex, if appropriate in concentrated form, is combined with water and optionally further additives to produce an aqueous dispersion of an adhesive. The disperse adhesive sets when the water evaporates and the particles of polymer flow together and form an uninterrupted film.

The present invention further provides for the use of the invention's polychioroprene latices, if appropriate in concentrated form, for producing molded foam articles, for bonding all types of fibers, for impregnating fabrics, for enhancing bitumen or bituminous materials, for producing dipped goods, the polychloroprene latices (if appropriate in concentrated form) being used either as sole latex component or in admixture with other latices.

When the polychloroprene latex (if appropriate in concentrated form) is used for producing molded foam articles, the polychloroprene latex is subjected to a foaming operation.

When the polychioroprene latex (if appropriate in concentrated form) is used for impregnating fabrics, the polychioroprene latex is applied to a fabric.

When the polychloroprene latex (if appropriate in concentrated form) is used for bonding fibers, fibers of natural origin or synthetic nature are treated with the polychloroprene latex.

When the polychloroprene latex (if appropriate in concentrated form) is used for enhancing bitumen or bituminous materials, bitumen or bituminous materials are treated with the polychioroprene latex. Enhancing here is to be understood as referring to the elasticizing or modifying of the bitumen or of the bituminous materials.

When the polychloroprene latex (if appropriate in concentrated form) is used for producing dipped goods, a dipping form is introduced into a coating bath containing the polychloroprene latex, a surface film forms on the dipping form, the dipping form is subsequently removed from the coating bath and the surface film which has formed on the dipping form as a result of being wetted with the latex according to the invention is subjected to a vulcanization.

Again, it is of great advantage for all the aforementioned uses that the latices are notable for low intrinsic odor.

When the invention's polychloroprene latices (if appropriate in concentrated form) are used in the aforementioned applications in admixture with other latices, all customary and known other latices are useful as further components. For example, SBR, acrylate or polyvinyl acetate latices are useful as further components.

The production of disperse adhesives based on polychloroprene latex is described for example in "Handbook of Adhesives", published by van Nostrand Reinhold, Third Edition, New York 1990, pages 301-305. The monograph by J. C. Carl (loc.cit.) gives a summarizing account of the typical latex applications such as molded foam production, fabric impregnation, fiber bonding, dipped goods production and bitumen enhancement.

The present invention further provides
the disperse adhesives based on the polychloroprene latices according to the invention,
the molded foam articles based on the polychloroprene latices according to the invention,
the fabrics impregnated with the polychloroprene latices according to the invention,
the fibers bonded with the polychloroprene latices according to the invention,
the bitumen or bituminous materials enhanced with the polychloroprene latices according to the invention, and also
the dipped goods based on the polychloroprene latices according to the invention.

EXAMPLES

Example 1 (Comparative) and Example 2 (Inventive)

a) Recipes for Examples 1 and 2

The emulsion polymers were produced using the following stock recipe (quantities reported in parts by weight per 100 parts by weight of chloroprene used):

|  | Example 1 (comparative) | Example 2 |
|---|---|---|
| Chloroprene | 100 | 100 |
| Constituents of aqueous phase: |  |  |
| Ion-free water | 100 | 100 |
| Disproportionated resin acid, sodium salt (dehydro-, dihydroabietic acid Na salt) | 3.5 | 3.5 |
| Condensation product of naphthalenesulphonic acid and formaldehyde (Na salt) sodium hydroxide | 1.0 | 1.0 |
| Activator (formamidinesulphinic acid) | 0.36 | 0.38 | b) Procedure of emulsion polymerization

Example 1 (Isothermal Operation) (Comparative)

A 4 l reactor was charged with the aqueous phase (1257 g) and the monomer phase (1200 g) as initial charge and this initial charge was purged with nitrogen. After the emulsion had been heated to 44° C., the polymerization was started by addition of a small amount (20 ml) of 2% aqueous formamidinesulphinic acid and continued by continuous further addition of the same solution to a conversion of 95%. After this degree of conversion was reached, the polymerization was stopped by addition of 0.1 part of diethylhydroxylamine in the form of an aqueous solution (10%). Unconverted monomers were removed under reduced pressure by means of steam down to a residual monomer content of about 800 ppm.

The conversions reported in Table 1 were gravimetrically determined on samples taken from the polymerization reactor at the respective times reported in Table 1.

Example 2 (Inventive)

Example 1 was repeated except that the starting temperature for the polymerization was chosen to be 40° C. and was gradually raised during the polymerization as reported below in Table 2. The conversions reported in Table 2 were gravimetrically determined on samples taken from the polymerization reactor at the respective times reported in Table 2.

c) Experimental Results

Tables 1 and 2 show the results of the conversion determinations in the course of the polymerizations of Examples 1 and 2 and also the respective polymerization temperatures.

TABLE 1

| Polymerization Time (h) | Example 1 (comparative) | | Example 2 (inventive) | |
|---|---|---|---|---|
| | Monomer conversion (%) | Polymerization temperature (° C.) | Monomer conversion (%) | Polymerization temperature (° C.) |
| 0 | 0 | 44 | 0 | 40 |
| 1.0 | 40 | 44 | 30 | 40 |
| 1.5 | 65 | 44 | 55 | 42 |
| 2.0 | 73 | 44 | 75 | 44 |
| 3.0 | 82 | 44 | 85 | 46 |
| 3.25 | — | — | 95 | 48 |
| 4.0 | 89 | 44 | | |
| 5.5 | 95 | 44 | | |

Comparing Inventive Example 2 and Comparative Example 1 immediately reveals the advantage of the invention that there is a distinct increase in the space-time yield to be observed.

d) Gel Content

The gel content of the polymers of the two examples was determined by determining that fraction of the polychloroprene latex that is insoluble in toluene at 23° C. To determine it, 250 mg of the polychloroprene latex are swollen in 20 ml of toluene by shaking at 23° C. for 24 hours. After centrifugation at 20 000 revolutions per minute, the insoluble fraction is separated off and dried. The gel content is calculated as the ratio of the dried residue to the initial weight and is reported in per cent by weight.

The result recited in Table 2 shows that the process according to the invention gives similar gel contents, suggesting a similar polymeric structure.

TABLE 2

| Example | Gel content in toluene (% by weight) |
|---|---|
| 1 (comparative) | 85 |
| 2 (inventive) | 84 | e) Sensory Testing

Of the latices obtained in Examples 1 and 2, 500 ml at a time were introduced into a 1 l wide neck flask, which was sealed and stored at room temperature for 24 h. After opening, the respective sample was odor-sensorially tested by three judges. They rated their perception of the odor against the following scale:
1=very good
2=good
3=neutral
4=unpleasant
5=very unpleasant The judges' ratings are summarized in Table 3.

TABLE 3

| Example | Judge A | Judge B | Judge C |
|---|---|---|---|
| 1 (comparative) | 3 | 4 | 4 |
| 2 (inventive) | 2 | 2 | 3 |

The judges' assessment was consistently more positive for the inventive latex.

f) Dimer Contents

The latices of Example 1 and Example 2 were subjected to a gas-chromatography test for dimer content (dimers of chloroprene monomer). The by-produced dimers comprise 6 structurally isomeric compounds, which are grouped together. The average dimer content determined from 5 gas-chromatographic assays per example is reported in Table 4:

TABLE 4

| Example | Dimer content |
|---|---|
| 1 (comparative) | 487 ppm |
| 2 (inventive) | 254 ppm |

Again, the distinctly reduced content of dimers—used as index substance for an ecological evaluation—demonstrates the advantage of the inventive polychloroprene latices.

What is claimed is:

1. A process for producing a latex of homo- or copolymers of chloroprene and if appropriate one or more further copolymerizable unsaturated monomers by emulsion polymerization, comprising, proceeding from a starting temperature $T_s$, raising the polymerization temperature during the emulsion polymerization
    a) by at least 3° C. above the starting temperature $T_s$ up to a conversion of 50% and subsequently
    b) increasing the polymerization temperature of part a) by at least another 3° C. up to a conversion of 90%.

2. The process according to claim 1, wherein the starting temperature $T_s$ and the polymerization temperature range from 0° C. to 70° C.

3. The process according to claim 1, wherein the starting temperature $T_s$ and the polymerization temperature range from 10° C. to 60° C.

4. The process according to claim 1, wherein proceeding from a starting temperature $T_s$, the polymerization temperature is raised during the emulsion polymerization
    c) by at least 5° C. above the starting temperature $T_s$ up to a conversion of 50% and subsequently
    d) increasing the polymerization temperature of part a) by at least 3° C. and at least 8° C. above the starting temperature $T_s$ up to a conversion of 90%.

5. The process according to claim 1, wherein the polymerization temperature is raised in stages or continuously.

6. The process according to claim 1, wherein as well as chloroprene, one or more further copolymerizable unsaturated monomers are used which are monomers having 3 to 12 carbon atoms and 1 or 2 copolymerizable C=C double bonds per molecule.

7. The process according to claim 6, wherein as well as chloroprene 2,3-dichlorobutadiene or 1-chlorobutadiene is used as further copolymerizable monomer.

8. The process according to claim 1, wherein the process is carried out either batchwise or continuously.

9. A process for producing a latex of homo- or copolymers of chloroprene and if appropriate one or more further copolymerizable unsaturated monomers by emulsion polymerization, comprising, proceeding from a starting temperature $T_s$, raising the polymerization temperature during the emulsion polymerization (a) by at least 5° C. above the starting temperature $T_s$ up to a conversion of 50% and subsequently (b) increasing the polymerization temperature of part a) by at least another 1° C. up to a conversion of 90%.

* * * * *